US008510383B2

(12) United States Patent
Hurley et al.

(10) Patent No.: US 8,510,383 B2
(45) Date of Patent: Aug. 13, 2013

(54) METHOD FOR PROVIDING EVENT BASED MEDIA STREAMS

(75) Inventors: Fergus Gerard Hurley, San Francisco, CA (US); Romain Henri Lacombe, Versailles (FR); Andrew J. Ofstad, San Francisco, CA (US); Brad A. Smith, San Francisco, CA (US)

(73) Assignee: Clixtr, Inc., San Francisco, CA (US)

( * ) Notice: Subject to any disclaimer, the term of this patent is extended or adjusted under 35 U.S.C. 154(b) by 960 days.

(21) Appl. No.: 12/559,258

(22) Filed: Sep. 14, 2009

(65) Prior Publication Data

US 2011/0066743 A1    Mar. 17, 2011

(51) Int. Cl.
*G06F 15/16*    (2006.01)
(52) U.S. Cl.
USPC ........... 709/205; 709/203; 709/218; 709/227; 709/231

(58) Field of Classification Search
USPC .................. 709/203–205, 217–219, 227, 228
See application file for complete search history.

(56) References Cited

U.S. PATENT DOCUMENTS

| | | | |
|---|---|---|---|
| 2006/0170956 A1* | 8/2006 | Jung et al. | 358/1.15 |
| 2007/0005363 A1* | 1/2007 | Cucerzan et al. | 704/256 |
| 2007/0099602 A1* | 5/2007 | Kurlander et al. | 455/418 |
| 2008/0133580 A1* | 6/2008 | Wanless et al. | 707/102 |
| 2008/0307320 A1* | 12/2008 | Payne et al. | 715/751 |
| 2009/0152349 A1* | 6/2009 | Bonev et al. | 235/383 |
| 2010/0076851 A1* | 3/2010 | Jewell, Jr. | 705/14.67 |

* cited by examiner

*Primary Examiner* — David Lazaro
(74) *Attorney, Agent, or Firm* — Jeffrey Schox

(57) ABSTRACT

A method for sharing event media in real-time by creating a media stream associated with an event location by gathering location information and receiving media from a first user; publishing the media stream to a participant zone; and adding content to the media stream by a second user in the participant zone. The participant zone is an area in which users are allowed event participant access, and the area extends from the event location.

24 Claims, 9 Drawing Sheets

 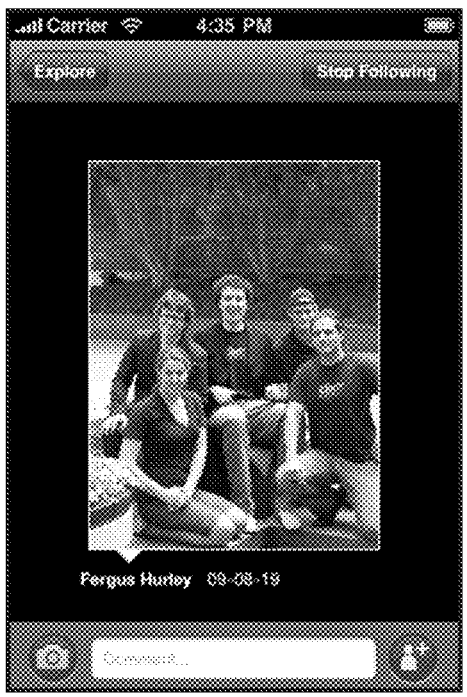
FIGURE 2A            FIGURE 2B
FIGURE 2C

METHOD FOR PROVIDING EVENT BASED MEDIA STREAMS

TECHNICAL FIELD

This invention relates generally to the media sharing field, and more specifically to a new and useful method in the event media sharing field.

BACKGROUND

Internet and server based applications have allowed for greater freedom in the sharing of multimedia. Media can be sent to friends and colleagues through email or Multimedia Messaging Service (MMS). Photo and video focused websites allow content to be uploaded and shared with friends and users across the world. Similarly, social networks have played a role in allowing people to connect and share media with friends. These implementations have enabled users to connect to individual people, established contacts, and the world at large. However, these implementations have failed to enable the creation and sharing of event centered media. Events can vary radically in their characteristics, such as number of participants (two vs. two million), level of privacy (small gathering of friends vs. a city-wide festival), location (a park vs. an apartment), and many other parameters that prevent established systems to adjust for the event media sharing requirements. Media for an event is often dispersed among different albums or collections of different users, and established contact with participants is needed in order for someone to obtain media other than their own for an event. Thus, there is a need in the media sharing field to create a new and useful method of sharing event media. This invention provides such a new and useful method.

BRIEF DESCRIPTION OF THE FIGURES

FIGS. 2A-2C are exemplary screenshots of a media stream;

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
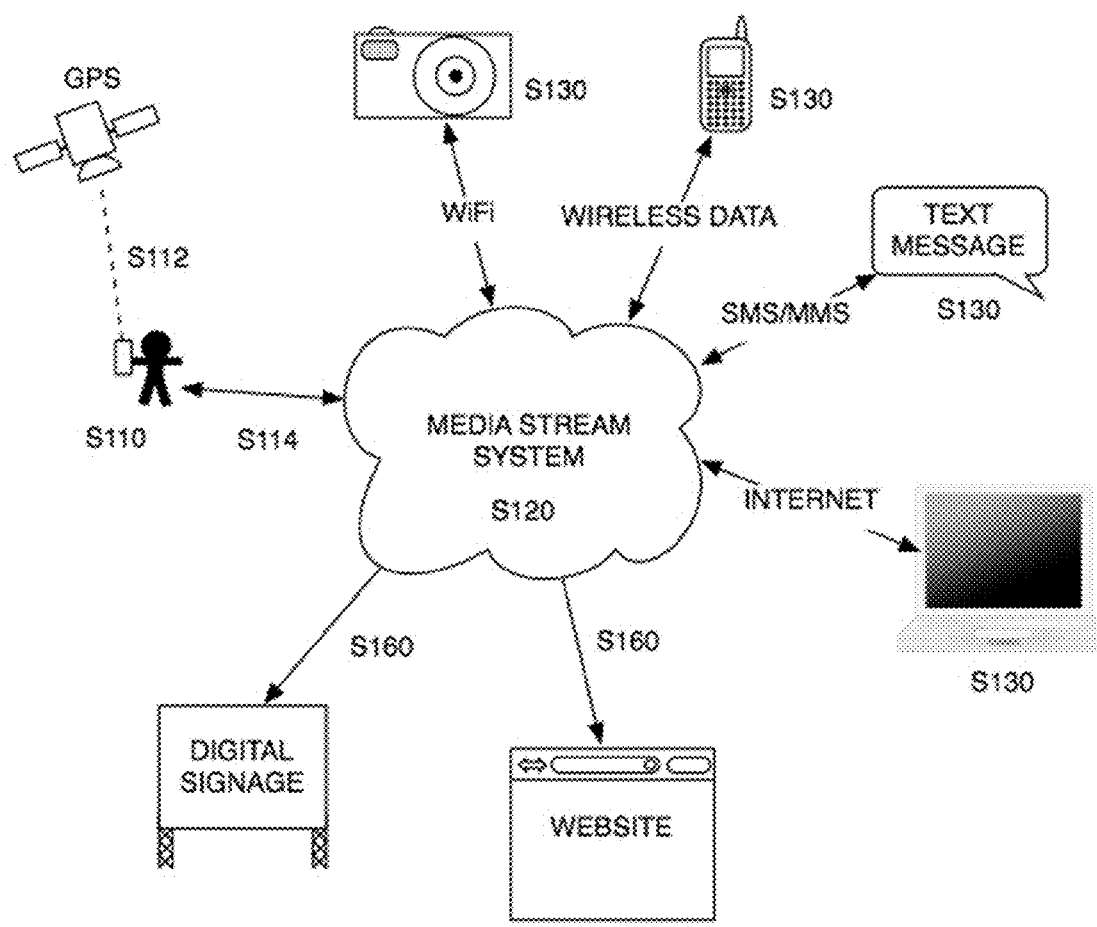
FIG. 1 is a flowchart representation of a first preferred embodiment of the invention.

As shown in FIG. 1, the method of the preferred embodiment includes creating a media stream associated with an event location S110, publishing the media steam to a participant zone S120, and adding content to the media steam contributed by a second user in the participant zone S130. The method functions to allow media from an event to be assembled and interacted with in real-time by people attending an event. The method additionally functions to make the media stream a location addressable media collection in which interaction and contribution requires navigating to a physical location (as opposed to a virtual address like a URL). A person's physical proximity to the physical location preferably allows participation in the actual event to be verified based on location. Additionally navigation to the media stream is preferably based on location. Alternatively, a person may additionally navigate to a media stream by searching for a location (so people not in attendance to an event may still participate remotely). This is not to limit the means of location a media stream such as by a Universal Resource Identifier (URI). The step of creating a media stream associated with a location preferably includes gathering location information of a first user S112, and receiving media S114. The method is preferably used with internet enabled devices such as smart phone, digital cameras, handheld gaming device, or any suitable mobile computing device. The method may alternatively use any suitable communication networks, such as through a Multimedia Messaging Service (MMS).

Step S110, which includes creating a media stream associated with an event location, functions to create an event themed collection of media. A media stream is preferably any collection of media, and the media stream is preferably organized as a timeline of the media (e.g., according to media metadata or by time uploaded to the media stream), as shown in FIGS. 2A-2C. The media stream may alternatively be a gallery, slideshow, or any suitable presentation. The media stream may additionally or alternatively be designed for application programming interface (API) based interactions or inclusion in other applications. The media stream is preferably dynamic, and automatically updates to include newly uploaded media. The media is preferably photos and textual comments, but the media may additionally or alternatively be video, audio, a graphic, or any suitable media file. The media stream is preferably dedicated to an event. An event is preferably an occurrence or social gathering defined by a location, time duration, purpose of social gathering, a group of people, and/or any suitable characteristic of an event. Events may be any scale of events from private parties where all the participants know each other or a large festival where the participants in an event do not have any established connection. Preferably events are defined by a set time frame (beginning and ending time), but may alternatively be defined without time constraints such as an event for a restaurant. Additionally, events may include social limitations where all the people know or are connected to each other, which would facilitate multiple distinct events at the same location (e.g., two birthday parties at the same bar on the same night). Additionally, titles or descriptions of an event may be applied to a media stream so that people can distinguish between events.

A media stream is preferably created with the sub-steps of gathering location information of a first user S112 and receiving media from the first user S114. The location information is preferably gathered from a global positioning system (GPS) of a mobile device used by the first user. A media source may additionally use positioning information gathered from telephone tower triangulation, internet router locating, or any form of geo-positioning. The location may alternatively be obtained by a user description. The location description is preferably a street address but may be a street description (corner of Walnut Avenue and First Street), landmark, business name, or any other description that can be used to look up or determine a geographic location. As yet another variation, the event location may be provided or improved by gathering location information from other users that access or contribute to a media stream. The media is preferably uploaded from a mobile device to a central server, but the media could alternatively be uploaded from a personal computer, sent in a multimedia message, sent in an email, or received by any suitable method. The initial received media may alternatively be provided by a second user.

Figure 3:
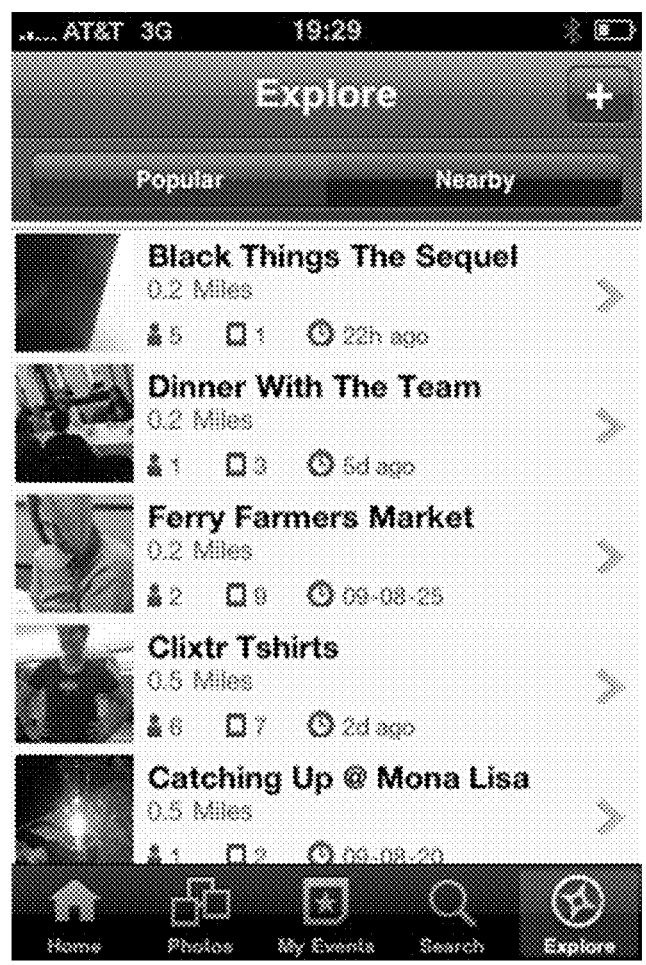
FIG. 3 is an exemplary screenshot of browsing events nearby.
Figure 5A:
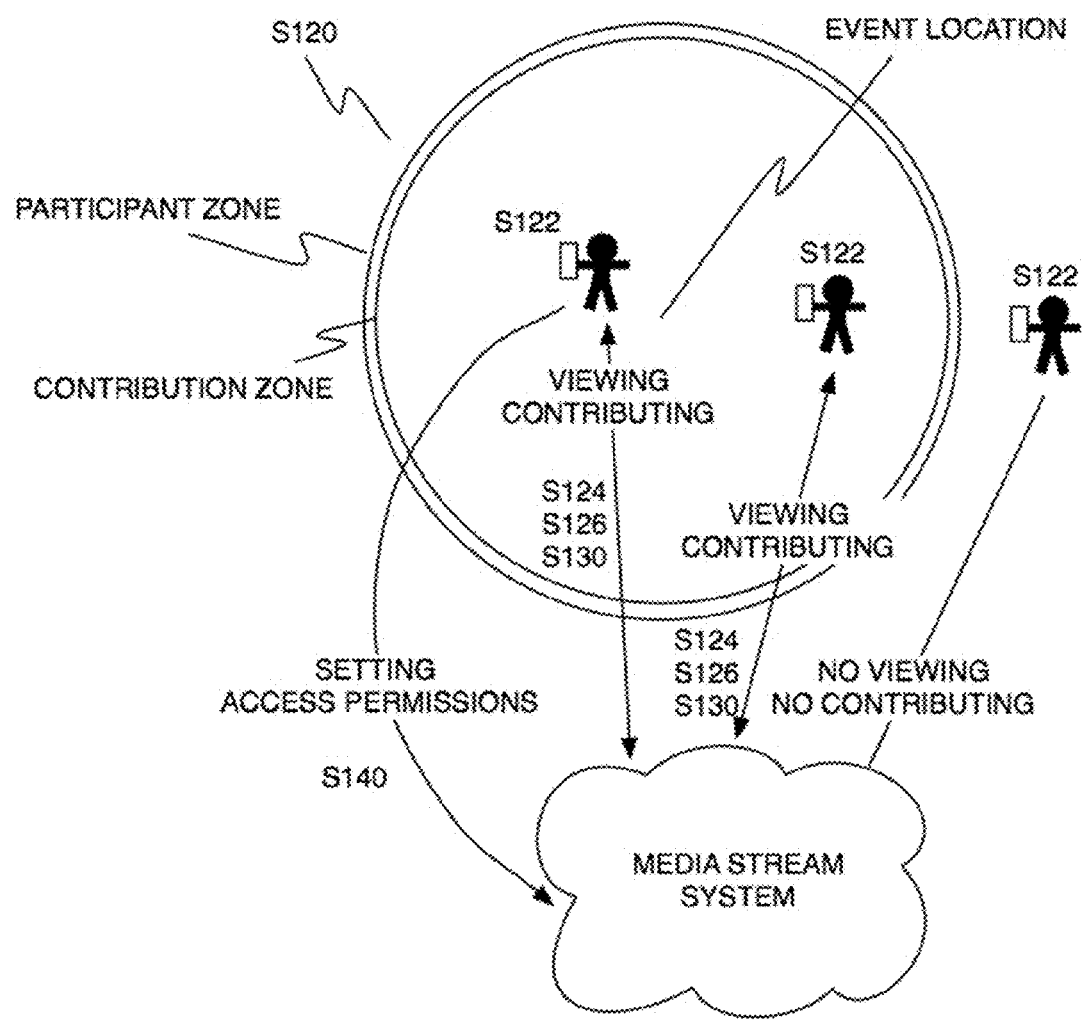
FIGS. 5A-5C are flowchart representations of the use of access permissions.
Figure 5B:
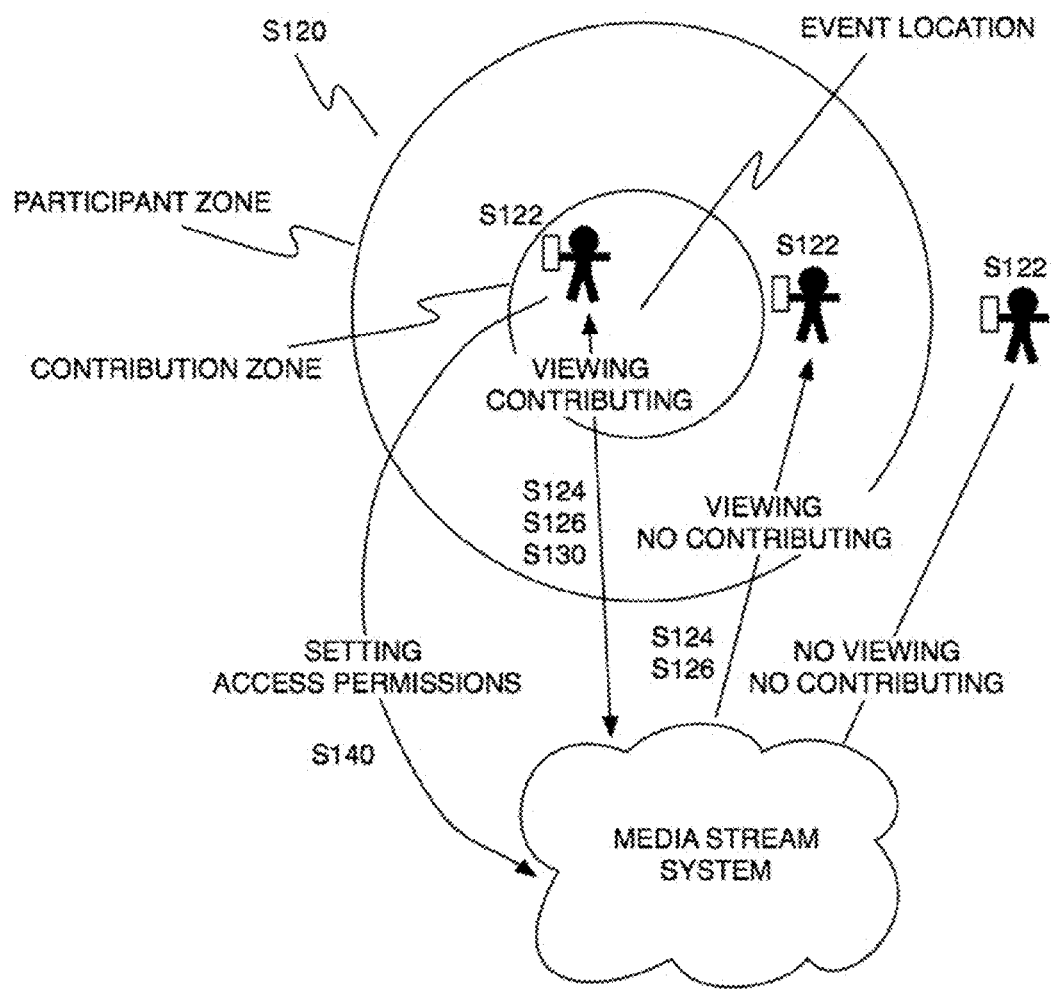
Figure 5C:
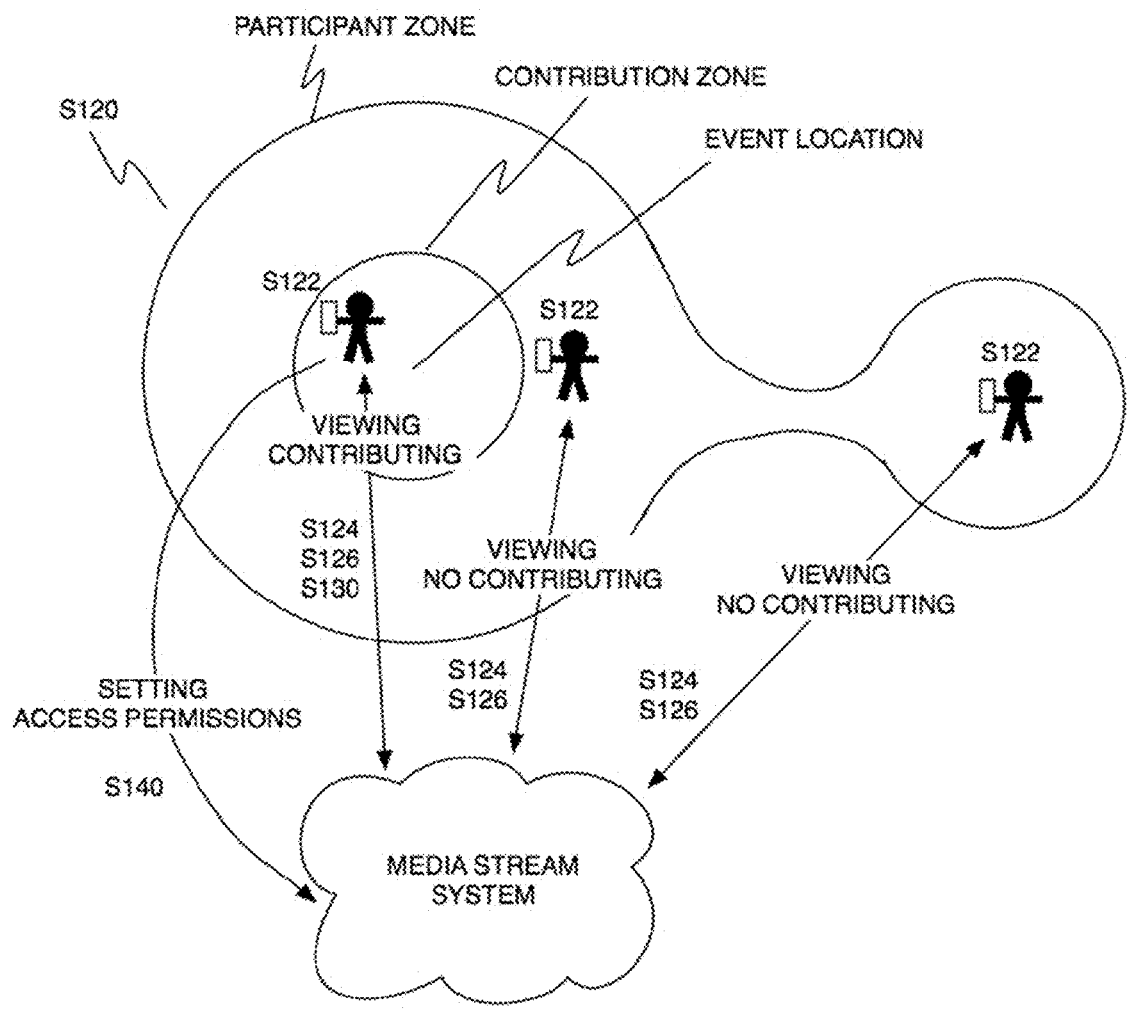

Step S120, which includes publishing the media stream to a participant zone, functions to allow users to access media streams based on geographic location as shown in FIGS. 5A-5C. A participant zone is preferably an area in which users are allowed event participant access, and the area preferably extends from the event location. Media streams are preferably discovered or accessed by a user physically being in the participant zone. By publishing the media stream based on location, then participants of an event can easily find, view, and contribute to the media stream. Step S120 preferably includes the steps of determining the location of a second user S122, identifying at least one media stream with a participant zone covering the location of the second user S124, and allowing event participant access for the second user to the identified media stream S126. The second user preferably is using a mobile device or computer from which the location may be determined in any of the suitable variations described above. A collection of media streams with nearby event locations can preferably be browsed as shown in FIG. 3. Alternatively, a second user may access a media stream without physically being near the location of the media stream. In this alternative, the second user may search for media streams by receiving a location description from a second user. The second user may additionally be invited, automatically notified when a contact joins a media event, browse to a media event (e.g., a list of most popular events), and/or be granted access to a media stream in any suitable manner. The participant zone is preferably defined by a collection of locations (e.g., land area or spatial volume) within a set distance from an event location. The distance is preferably a default range (i.e., 500 feet) but could also be set by a moderator (or a contributor) of the media stream. Additionally, the distance of a participant zone may dynamically change based on characteristics of a media stream such as the number of participants (viewers and/or contributors), the location variance of the participants, location variance of the media files, the number of media files in the media stream, or any suitable parameter. The set distance preferably will increase for media streams with more location variance and/or more participants. The set distance will conversely decrease, if the location of participants or media files are concentrated in one location and/or that have few participants. The defined location may be a 3D space, if the event is held in a multi-story building. Alternatively, the participant zone may be assigned to landmarks at known locations. For example, if the event location is known to be in a park, then the whole park may be a participant zone. While if the event location is at a residential address, the participant zone will only be for the area defined by that street address. Multiple event locations may additionally be associated with a media stream, and the media stream is preferably additionally published to a second participant zone covering an area extending from the second additional event location, as shown in FIG. 5C. Events that take part in multiple locations or that change locations may use multiple event locations to accommodate for the non-singular and/or stationary location.

Step S130, which includes adding content to a media stream contributed by a second user in the participant zone, functions to have content added to the media stream by participants of an event. A second user can preferably add media to an event by uploading media in any of the variations described above. A user is preferably able to contribute media once the user has been allowed event participant access. There may additionally be different requirements for viewing and contributing such as those set in access permission rules of the media stream. Contributing to a media stream may additionally mean tagging, commenting, captioning, or adding text to the media stream.

Figure 4:
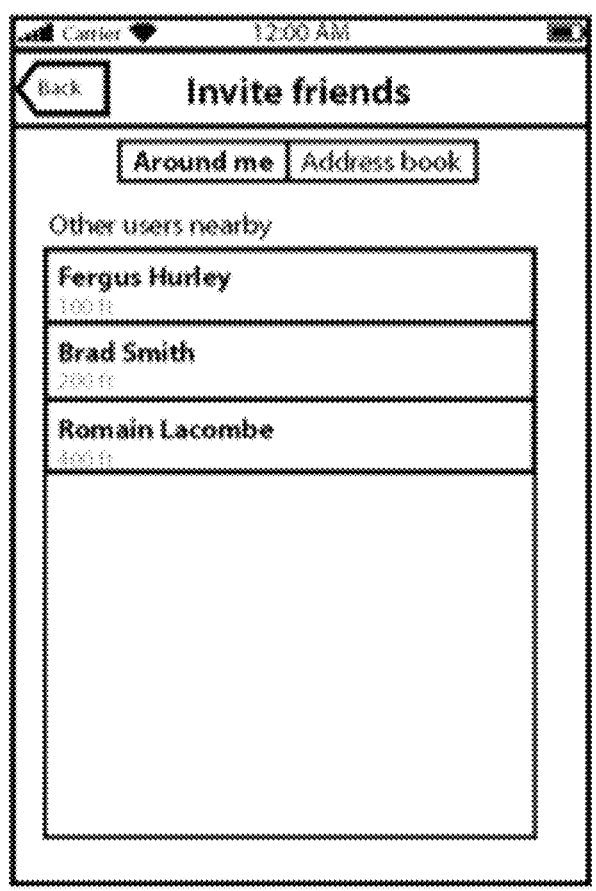
FIG. 4 is an exemplary screenshot of a contact list.
Figure 6:
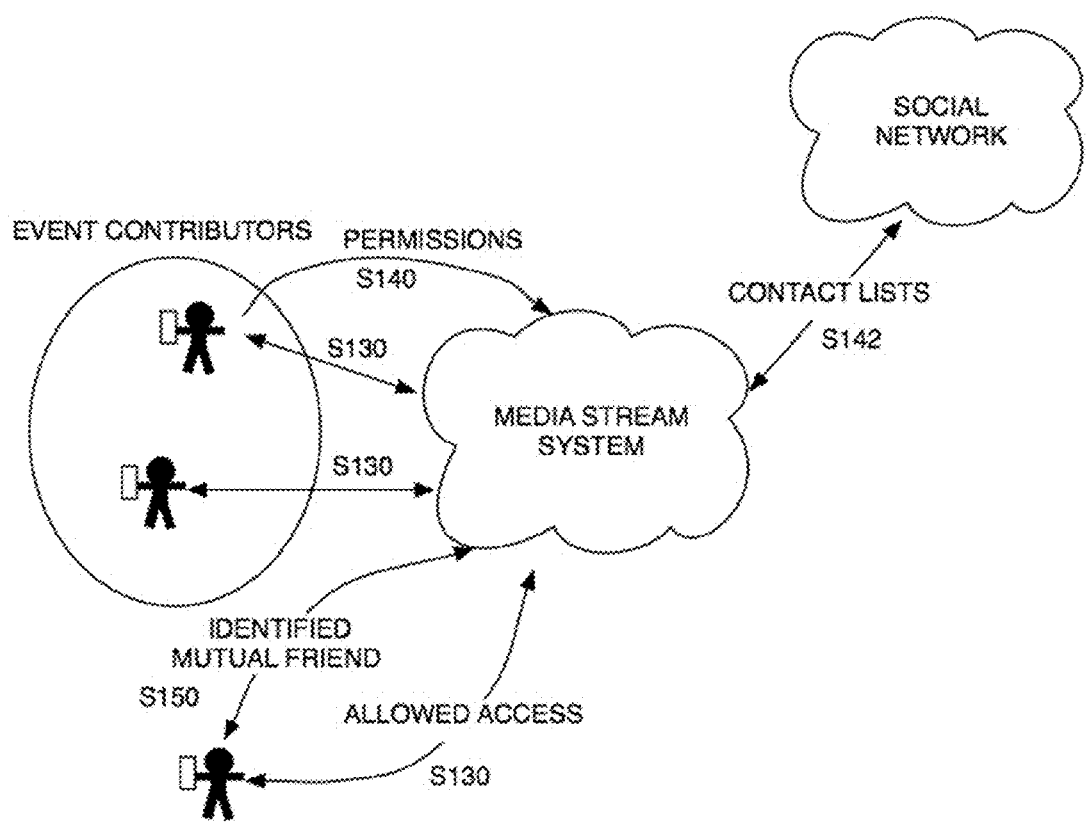
FIG. 6 is a flowchart representation of the use of a social networks and contact lists.

Additionally, the method includes setting access permissions through a contact list S140, as shown in FIGS. 5A-5C. Step S140 functions to allow specified limitations to adjust the interaction and viewing properties of a media stream. The access permissions are preferably the rules governing a restriction and/or permission to view or contribute to media stream. Alternatively, restrictions may include limits on the number of added media, rate of media uploading to a media stream, and/or any suitable limitations of interacting with a media stream. Additionally, restrictions may be placed on users based on location or proximity to the event location. Permissions may alternatively or additionally include invitations or notifications. Invitation permissions preferably include contacts that should be invited to participate in an event. Notification permissions preferably include contacts that should be alerted to the creation or modification of a media event. Users within the participant zone may be able to view a media stream, but must preferably be within a contribution zone to add media. The contribution zone is preferably a subset of the area defined by the participant zone. The contribution zone may cover an equal area (shown in FIG. 5A) or a smaller area (shown in FIG. 5B) preferably closer to the event location. As another example of location based restrictions, an area may be blocked from participating in a media stream. The access permissions may be applied globally (to all users), to all contacts, to all non-contacts, to groups of contacts, and/or individual contacts. The group settings may be based on contact list groups ("friends", "family", "coworkers", etc.). The contacts are preferably a collection of names known to the users. The contacts may be pulled from a phone address book, be established within the media stream system (e.g., a media stream application), or found from any suitable source. Additionally, the method may include accessing a contact list of a social network 142, as shown in FIG. 6, which functions to allow access permissions to be set for more complex social connections. For example, the social network allows friends of friends, mutual contacts, and other social connections to be determined for event participants. Additionally, the method may pool contact lists of users to form a contact list of the event. As an event may be any collection of people, using the contact lists of multiple event participants function to share the event without a bias for a single participant. A pooled contact list could allow all contacts of contributors to view a media stream (in contrast to just the contacts of one user). Access may additionally be established by sending an invitation to a contact. The invitation is preferably an email, a SMS message, or any suitable electronic message. The invitation preferably includes a link or code that allows the contact to access the media stream. When a user is setting access permissions or sending messages or invitation the contacts may additionally be filtered according to proximity to an event. Contacts that are closer to an event are preferably listed first in a list of contacts, as shown in FIG. 4. In one embodiment, the contact list is a list of nearby contacts. The nearby contact list preferably lists contacts within a set distance from a user (e.g., first user or second user). The nearby contact list may additionally be organized by proximity to the event location of a media event or to a user. The location and proximity of contacts is preferably established by the contacts interacting with other media events. The location of contacts may alternatively be established by obtaining contact location information from a social network using an Application Programming Interface (API) or by any suitable method. An administrator (e.g., the person to initially create the media stream) preferably sets the preferences. Alternatively any suitable user may act as an administrator.

Additionally, or alternatively the method may include identifying contacts in the media of the media stream S150. This functions to identify people recorded in the photos, video, and/or audio of the media stream. This step preferably uses facial recognition or alternatively voice recognition to identify the contacts. Alternatively, the contacts may be identified by users that tag photos. This tagging may function to contribute to facial recognition source data, the data used to form a facial signature. Additionally, the method may access a contact list of a social network, and use photos from outside resources for facial recognition source data. Multiple contact lists either from users or from social networks may be used as the source data for facial recognition. The method may additionally find mutual friends or predictive algorithms to reduce source data to the most likely contacts that would be found at an event. For example, mutual contacts of event participants may be used. The identification of contacts may initiate sending invitations to access a media stream. Identified contacts may additionally be a group with specific access permissions set in Step S140

Figure 7:
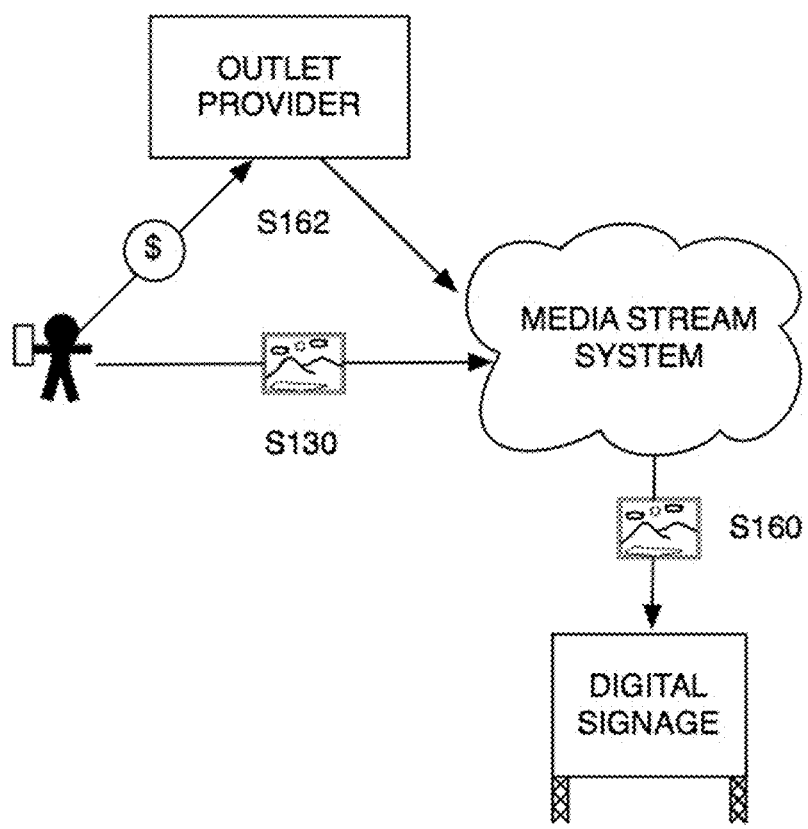
FIG. 7 is a flowchart representation of monetization of a media stream outlet.

As shown in FIG. 7, an additional step to the preferred embodiment the media stream may include sending the media stream to an outlet S160. Step S160 functions to enable various applications of displaying a media stream including, monetizing a media stream, opening up use of the media stream, and centralizing the output to a single device. For example, an outlet may be a third party application or website that streams the media content. Another example of an outlet would be digital signage that could allow users to add their content to a device seen by many people (such as on a large screen at a sporting or music event). The step may additionally include confirming payment to allow a user to contribute to a media stream S162. In some scenarios, the provider of such an outlet may monetize the media stream outlet by implementing Step S162. Alternatively advertisements may be added to a media stream as another means to monetize the media stream service.

As a person skilled in the art will recognize from the previous detailed description and from the figures and claims, modifications and changes can be made to the preferred embodiments of the invention without departing from the scope of this invention defined in the following claims.

We claim:

1. A method for sharing event media in real-time comprising:
   creating a media stream associated with an event location by gathering location information to use as the event location;
   publishing the media stream to a participant zone that is an area in which users are allowed event participant access, the area extending from the event location; and
   adding content to the published media stream contributed by a first user located within a contribution zone, the contribution zone being a subset area of the participant zone, wherein publication of content to the media stream is limited to users within the contribution zone;
   adding content to the published media stream contributed by a second user located within the contribution zone.
2. The method of claim 1, wherein the media stream is associated with an event that is a social gathering defined by the event location and a time duration.
3. The method of claim 1, wherein the participant zone is defined by an area within a set distance from the event location.
4. The method of claim 1, wherein the media is captured by a mobile computing device.
5. The method of claim 4, wherein the location information is gathered by a global positioning system (GPS) of the mobile computing device.
6. The method of claim 4, wherein the step of publishing the media stream further includes:
   determining a location of a second user,
   identifying at least one media stream with a participant zone covering the location of the second user, and
   allowing event participant access to the identified media stream.
7. The method of claim 4, further including collecting location information from a plurality of users contributing media to the media stream and determining the event location from the collected location information.
8. The method of claim 4, further including associating a second event location with the media stream and publishing the media stream to a second participant zone covering an area extending from the second event location.
9. The method of claim 4, including the step sending a media stream to an outlet.
10. The method of claim 9, wherein the outlet is digital signage.
11. The method of claim 9, including confirming payment prior to allowing a user to contribute to a media stream.
12. The method of claim 1, further including setting access permissions through a contact list.
13. The method of claim 12, including pooling contact lists of users to form the contact list of the media event.
14. The method of claim 12, including accessing the contact list from a social network.
15. The method of claim 12, wherein the contacts of the contact list with known location information are sorted according to proximity to the event location.
16. The method of claim 12, wherein the contact list is a list of contacts within a set distance from a user.
17. The method of claim 16, wherein the contact list is sorted according to distance from the user.
18. The method of claim 16, wherein the location of a contact is obtained from a social network Application Programming Interface (API).
19. The method of claim 1, including identifying contacts in media of the media stream.
20. The method of claim 19, wherein facial recognition is used to identify contacts.
21. The method of claim 1, further comprising dynamically adjusting the area associated with participation zone based on characteristics of the media stream.
22. The method of claim 21, wherein dynamically adjusting the area associated with the participation zone based on characteristics of the media stream comprises dynamically adjusting the area associated with the participation zone based on location variance of users within the participation zone.
23. The method of claim 22, wherein dynamically adjusting the area associated with the participation zone based on the location variance of users within the participation zone comprises increasing the area associated with the participation zone with increasing location variance of the users within the participation zone.

24. The method of claim 1, wherein the area associated with the contribution zone is different from the area associated with the participation zone.

\* \* \* \* \*